(12) United States Patent
Jurey et al.

(10) Patent No.: US 10,732,906 B2
(45) Date of Patent: Aug. 4, 2020

(54) MULTI-DEVICE STORAGE WITH CONSOLIDATED CHANNEL AND CONTROL CIRCUITRY

(71) Applicant: Seagate Technology LLC, Cupertino, CA (US)

(72) Inventors: Philip Jurey, Longmont, CO (US); Dale T. Riley, Longmont, CO (US); John W. Shaw, Frederick, CO (US)

(73) Assignee: Seagate Technology LLC, Fremont, CA (US)

( * ) Notice: Subject to any disclaimer, the term of this patent is extended or adjusted under 35 U.S.C. 154(b) by 786 days.

(21) Appl. No.: 14/632,766

(22) Filed: Feb. 26, 2015

(65) Prior Publication Data

US 2016/0253108 A1    Sep. 1, 2016

(51) Int. Cl.
*G06F 3/06* (2006.01)
*G11B 5/012* (2006.01)

(52) U.S. Cl.
CPC ......... *G06F 3/0689* (2013.01); *G06F 3/0613* (2013.01); *G06F 3/0658* (2013.01); *G06F 3/0688* (2013.01); *G11B 5/012* (2013.01)

(58) Field of Classification Search
USPC ........................................................ 711/114
See application file for complete search history.

(56) References Cited

U.S. PATENT DOCUMENTS

| | | | | |
|---|---|---|---|---|
| 4,653,478 A | * | 3/1987 | Nagasaki | A61B 1/05 348/70 |
| 4,882,619 A | * | 11/1989 | Hasegawa | H04N 5/2253 348/265 |
| 5,241,494 A | * | 8/1993 | Blyth | G11C 7/16 365/185.03 |
| 5,918,068 A | | 6/1999 | Sahfe | |
| 6,018,430 A | * | 1/2000 | Ho | G11B 19/28 360/48 |
| 6,342,986 B2 | * | 1/2002 | Nguyen | 360/53 |
| 6,490,121 B1 | * | 12/2002 | Pruett | G11B 5/5547 360/77.01 |
| 6,760,820 B2 | * | 7/2004 | Henson | G06F 3/0613 710/240 |
| 6,798,701 B2 | * | 9/2004 | Yamazaki | G11C 29/1201 365/189.05 |

(Continued)

FOREIGN PATENT DOCUMENTS

| | | |
|---|---|---|
| EP | 0323154 | 7/1989 |
| EP | 0446733 | 9/1991 |

(Continued)

*Primary Examiner* — Mano Padmanabhan
*Assistant Examiner* — Jean C Edouard
(74) *Attorney, Agent, or Firm* — Hall Estill Attorneys at Law

(57) ABSTRACT

Apparatus and method for managing data in a multi-device data storage system. In some embodiments, a plurality of data storage devices are provided, each data storage device having a local driver circuit adapted to transfer data with a local memory module. A main driver circuit external to the plurality of data storage devices is configured to stream frequency modulated write data via parallel data transfer paths to the respective local driver circuits for concurrent transfer of the frequency modulated write data to the respective local memory modules.

20 Claims, 8 Drawing Sheets

(56) References Cited

U.S. PATENT DOCUMENTS

| | | | |
|---|---|---|---|
| 7,486,459 B1* | 2/2009 | Schreck | G11B 5/3133 360/234.4 |
| 8,560,879 B1 | 10/2013 | Goel | |
| 8,582,226 B2* | 11/2013 | Tetzlaff | G11B 5/012 360/46 |
| 8,947,816 B1* | 2/2015 | Ryan | G06F 13/287 360/55 |
| 2001/0000981 A1* | 5/2001 | Nguyen | G11B 5/012 360/53 |
| 2002/0036857 A1* | 3/2002 | Teo | G11B 5/012 360/66 |
| 2002/0083393 A1* | 6/2002 | Hall | G11B 20/1833 714/785 |
| 2002/0083394 A1* | 6/2002 | Hall | G11B 20/1833 714/785 |
| 2002/0154439 A1* | 10/2002 | Sloan | G11B 5/5521 360/75 |
| 2002/0186432 A1* | 12/2002 | Roorda | H04J 14/0204 398/82 |
| 2003/0107834 A1* | 6/2003 | Fish | G06F 3/0626 360/69 |
| 2003/0184459 A1* | 10/2003 | Engl | G11C 27/026 341/120 |
| 2003/0196023 A1 | 10/2003 | Dickson | |
| 2003/0214845 A1* | 11/2003 | Yamazaki | G11C 29/1201 365/189.04 |
| 2004/0019741 A1* | 1/2004 | Pratt | G06F 3/0613 711/114 |
| 2004/0153721 A1 | 8/2004 | Fujimoto | |
| 2006/0277362 A1* | 12/2006 | DeCenzo | G06F 11/1076 711/114 |
| 2007/0115541 A1* | 5/2007 | Rogers | H01S 3/06754 359/345 |
| 2007/0230020 A1* | 10/2007 | Leis | G11B 5/6005 360/75 |
| 2008/0030888 A1* | 2/2008 | Brunnett | G11B 5/59666 360/75 |
| 2008/0094974 A1* | 4/2008 | Worthington | G01N 35/00069 369/53.2 |
| 2009/0006073 A1* | 1/2009 | Mahr | G11B 5/59688 703/27 |
| 2011/0043938 A1* | 2/2011 | Mathew | G11B 5/59688 360/31 |
| 2011/0132092 A1* | 6/2011 | Thomas | G01N 27/90 73/627 |
| 2011/0168909 A1* | 7/2011 | Nakao | G01T 1/247 250/370.09 |
| 2012/0206281 A1* | 8/2012 | Bashirullah | H03M 1/1061 341/110 |
| 2012/0250484 A1* | 10/2012 | Polley | G11B 5/6029 369/53.39 |
| 2013/0007556 A1* | 1/2013 | Patapoutian | H03M 13/6561 714/755 |
| 2014/0168809 A1* | 6/2014 | Wilson | G11B 20/10222 360/46 |
| 2014/0185158 A1* | 7/2014 | Li | G11B 5/6011 360/39 |

FOREIGN PATENT DOCUMENTS

| | | |
|---|---|---|
| JP | 04-057274 | 2/1992 |
| JP | 06-259929 | 9/1994 |
| JP | 08-022379 | 1/1996 |
| JP | 08-221218 | 8/1996 |
| JP | 08-328760 | 12/1996 |
| JP | 2001-167040 | 6/2001 |

* cited by examiner

MULTI-DEVICE STORAGE WITH CONSOLIDATED CHANNEL AND CONTROL CIRCUITRY

SUMMARY

Various embodiments of the present disclosure are generally directed to a multi-device storage system that uses consolidated data channel and control circuitry, such as for use in a cloud computing environment.

In some embodiments, a plurality of data storage devices is provided, each having a local driver circuit adapted to transfer data with a local memory module. A main driver circuit external to the plurality of data storage devices is configured to stream frequency modulated write data via parallel data transfer paths to the respective local driver circuits for concurrent transfer of the frequency modulated write data to the respective local memory modules.

In other embodiments, a multi-device storage enclosure has a housing, a control board and a plurality of storage devices. The control board includes a read/write channel and a first stage preamplifier/driver circuit configured as a multi-channel data multiplexer. The data storage devices each have a second stage preamplifier/driver circuit configured to communicate with a plurality of movable data transducers adjacent rotatable data recording surfaces. The first stage preamplifier/driver circuit is configured to stream frequency modulated write data via parallel data transfer paths to the respective second stage preamplifier/driver circuits for concurrent transfer of the frequency modulated write data to the respective data recording surfaces.

In other embodiments, a method includes coupling a plurality of local driver circuits in a corresponding plurality of data storage devices to a main driver circuit external to the plurality of data storage devices. Frequency modulated write data are streamed via parallel data transfer paths to the respective local driver circuits for concurrent transfer of the frequency modulated write data to memory modules of the data storage devices coupled to the local driver circuits.

DETAILED DESCRIPTION

Figure 1:
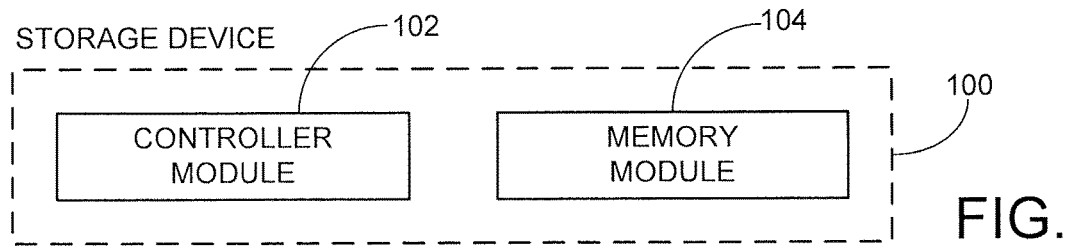
FIG. 1 is a block diagram for a data storage device.

The present disclosure generally relates to multi-device data storage systems, and more particularly to a multi-device storage system having consolidated data channel and control circuitry.

Multi-device storage systems employ multiple data storage devices which are operationally arranged to provide a high data capacity memory storage space. The devices are grouped together into a mass storage assembly (MSA) or other module that may be removably installed into a rack system (e.g., a server cabinet).

Multi-device storage systems can take a variety of forms including servers, cloud storage modules, RAID (redundant array of independent discs) systems, extended memory systems (JBODs, or "just a box of drives"), etc. The storage systems can be accessed locally or over a network including a local area network (LAN), a wide area network (WAN), the Internet, etc. A storage enclosure can include various active elements such as storage devices, control boards, power supplies, fans, boot devices, etc.

While operable to provide highly efficient computer storage, multi-device storage systems can be relatively expensive to procure and operate. A significant portion of the overall cost of a multi-device storage system is often attributable to the individual storage devices, which are often stand-alone devices suitable for individual use in separate computing environments. In turn, a significant cost item associated with the devices is the device control circuitry used to facilitate independent operation of each of the devices.

Accordingly, various embodiments are generally directed to a method and apparatus for managing data in a multi-device storage system. As explained below, multiple storage devices are provided to form an overall memory storage space. Each of the devices includes a memory and a pre-amplifier/driver (preamp) circuit adapted to perform data transfer operations with the memory.

A main preamp circuit is coupled to each of the device preamp circuits and is used to transfer read and write data along parallel paths to each of the device preamp circuits. The main preamp circuit operates as a high speed, high bandwidth data multiplexer that streams respective write data to, and receives streamed read data from, each of the local preamps. Selection logic, such as a number of multiplexer (mux) circuits, direct control data to the respective storage devices during data access (read and write) operations.

The main preamp circuit and other selection logic can be provided on an external printed circuit (PC) board. The external PC board includes consolidated control electronics such as a read/write (R/W) channel, servo circuitry, data buffer, etc. utilized by each of the storage devices.

In this way, a low cost, high performance multi-device solution, such as a cloud computing network application, is provided in which a single set of electronics is used to control a population of local storage devices. By consolidating certain functions on an external control board such as read/write channel circuitry, data buffers, control logic, servo control, etc., lower cost "dummy storage devices" can be operated in tandem. The dummy storage devices will not necessarily be stand-alone devices capable of operating individually in a separate computing environment, but will have sufficient native electronics to be able to operate with the external data channel supplied by the external control board.

In some cases, the devices are individually operated "one at a time" to provide a low cost cold storage solution. In this scenario, the control board switches from one device to the next, powering each one up in turn as needed so that only one of the devices is active and the remaining devices are inactive. It is contemplated, however, that in other embodiments multiple sets of the devices may operate concurrently.

In some embodiments, the main preamp on the external control board is nominally identical to the local preamps used in the individual storage devices. In other embodiments, the preamps take different configurations. The memory of the storage devices can take a variety of forms such as rotatable data recording media (discs), solid-state memory, magnetic tape, optical discs, etc. While preamps are exemplified herein, other forms of drivers can be used as desired.

These and other features and advantages of various embodiments can be understood beginning with a review of FIG. 1 which shows an exemplary data storage device 100. The data storage device 100 includes a controller module 102 and a memory module 104. The controller module 102 provides top level control functionality for the storage device, and may be realized in hardware, software and/or firmware. The memory module 104 provides non-volatile memory storage for user data transferred to the storage device by a host device.

The memory module 104 can take a variety of forms including rotatable data recording media and/or non-volatile solid-state memory such as flash memory, spin-torque transfer random access memory (STRAM), resistive random access memory (RRAM), etc. In some cases, the controller module functionality can be incorporated into the memory module 104.

The storage device 100 may be a stand-alone device capable of independent operation when interfacing with a host device, or may be a consolidated function (e.g., "dummy") device that has some native capability but relies on some amount of external consolidated circuitry in order to carry out data transfer functions with a host. It will be noted that, except as discussed below, the overall circuitry of a stand-alone device and a consolidated function device is largely the same; one difference is the extent to which such circuitry is incorporated into the device instead of being physically located external to the device. Another difference is the extent to which the external circuitry is multiplexed among multiple storage devices in a multi-device environment.

Figure 2:
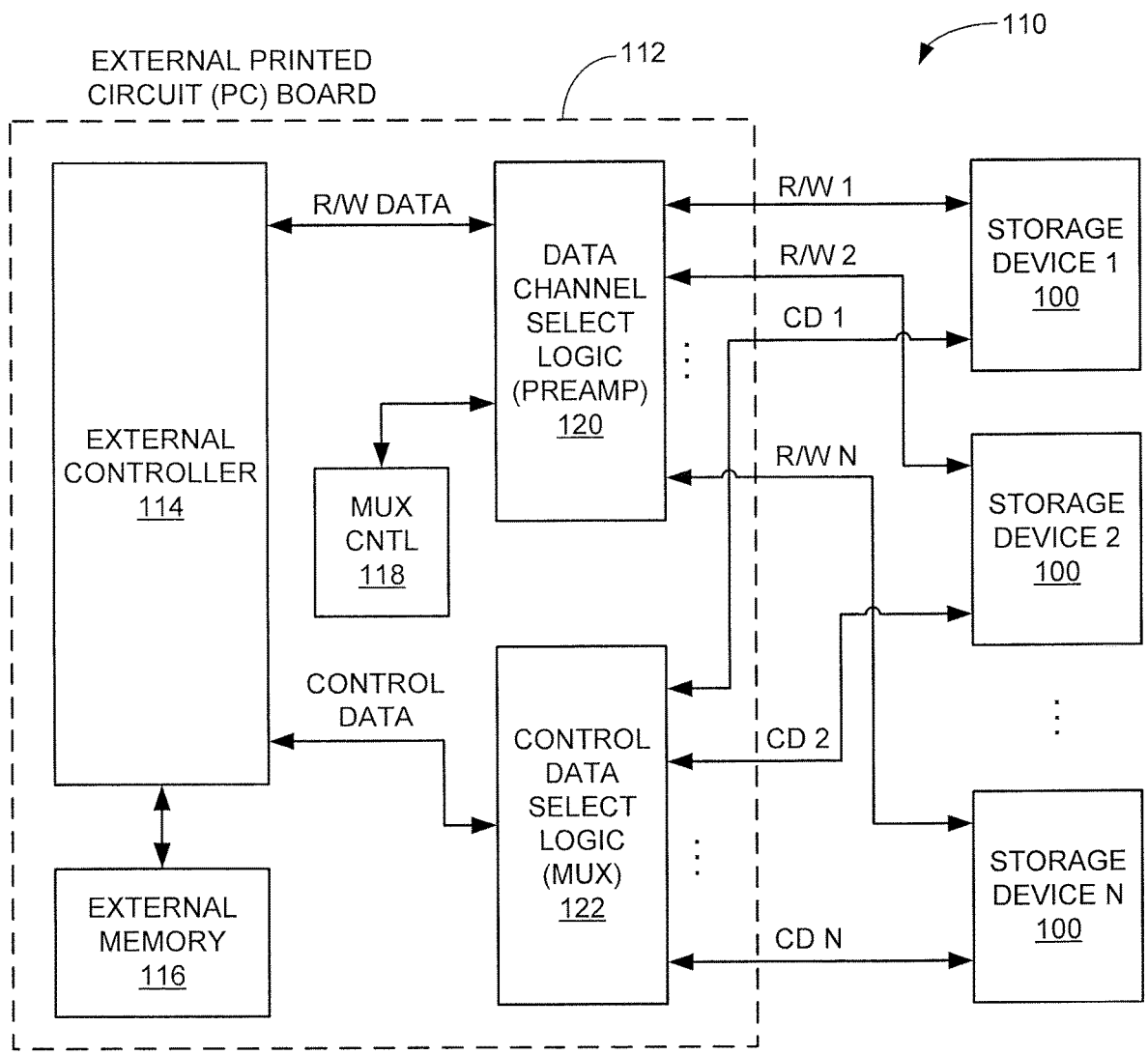
FIG. 2 is a block diagram of a multi-device storage system constructed and operated in accordance with various embodiments.

FIG. 2 is a functional block representation of a multi-device storage system 110 that incorporates a total number N storage devices 100 from FIG. 1. The storage devices 100 in FIG. 2 are configured as dummy devices and are controlled by an external printed circuit board assembly (PCBA) 112. The PCBA 112, also referred to as a PC board or control board, provides certain consolidated electronics modules that are shared by the respective storage devices 100. These modules include an external controller 114 and associated memory 116, a MUX controller module 118, data channel selection logic 120 and control data selection logic 122. Other configurations can be used.

The data channel selection logic 120 takes the form of a preamplifier/driver circuit (preamp) such as the type used in multi-transducer hard disc drives (HDDs). As will be recognized, preamps such as 120 include a number of features to support the writing and reading of data from multiple memory locations, such as write drivers, automatic gain control (AGC) stages, preamplifiers, head selection logic, etc.

In the exemplary system 110 in FIG. 2, read/write (R/W) data are transferred between the external controller 114 and the preamp 120. The MUX controller 118 provides a selection input to select one of the N storage devices 100 to which the data are to be directed or from which the data are to be received. The preamp 120 accordingly establishes a selected interconnection along various parallel data pathways (R/W 1 through N). During a write operation, write data are streamed to the associated storage device 100 for writing thereto. During a read operation, read data are streamed from the associated storage device 100 for processing by the controller 114.

Various control signals, generally denoted as "control data" in FIG. 2, are generated and forwarded from the controller 114 to the control data selection logic 122, which may take the form of one or more multiplexers (mux). The selection logic 122 accordingly directs the control data along various parallel data pathways (CD 1 through N) to the respective storage devices 100 as required.

Figure 3:
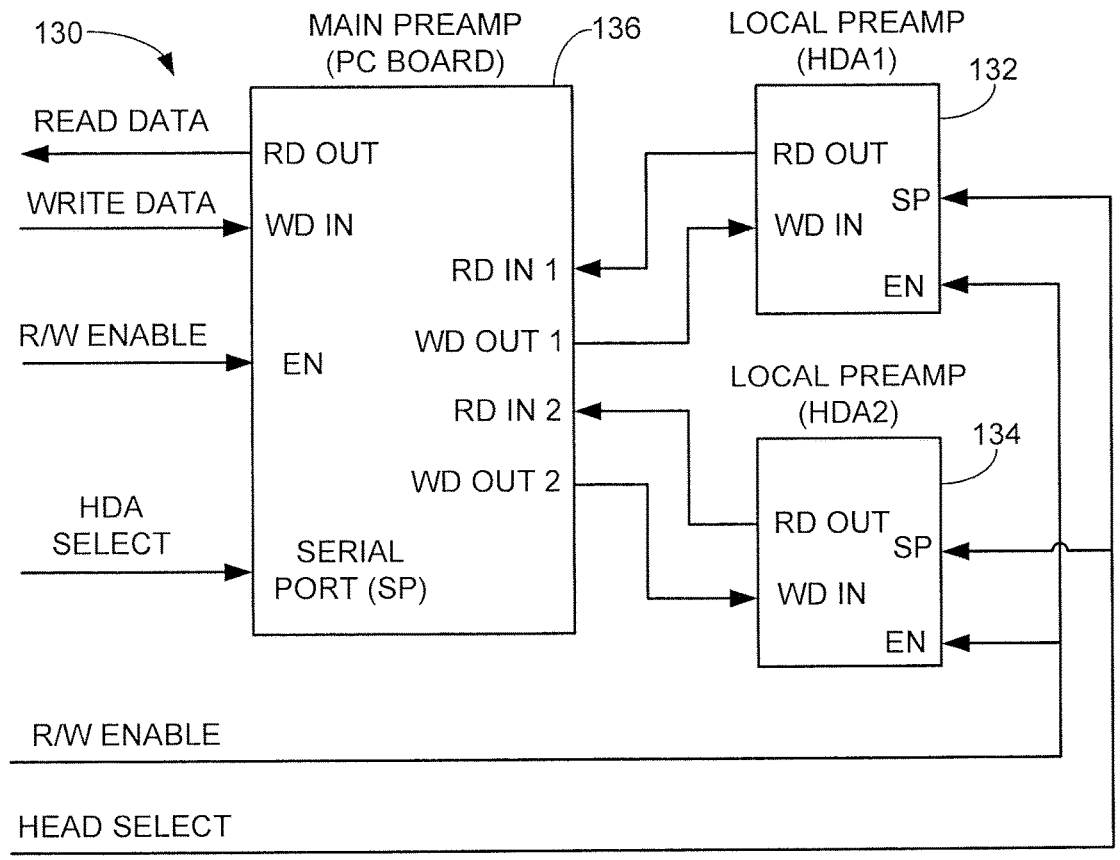
FIG. 3 shows aspects of the system of FIG. 2 in accordance with some embodiments.

FIG. 3 shows a portion of another multi-device storage system 130 similar to the system of FIG. 1. For purposes of providing a concrete illustration, the system 130 uses a PC board such as 112 in FIG. 2 to control first and second storage devices, characterized as head/disc assemblies (HDAs). The first HDA (HDA 1) includes a first local preamp 132, and the second HDA (HDA 2) includes a second local preamp 134. The local preamps 132, 134, also referred to as secondary preamps, may be nominally identical to each other, and may further be nominally identical to a main preamp 136 located on the PC board.

At this point it will be noted that the term HDA generally refers to a disc-based, electro-mechanical storage device subassembly with various features including a sealed housing in which one or more rotatable magnetic recording media (discs) and associated data transducers (heads) are located. The transducers may be positioned adjacent tracks on the media surfaces using a movable actuator assembly. A preamp (such as the local preamps 132, 134) may be disposed within the housing and attached to the actuator assembly proximate the heads. Other components may be incorporated into the HDA, such as a spindle motor used to rotate the disc(s), a voice coil motor (VCM) used to pivot the actuator assembly, etc. Various local control electronics, such as drivers, controllers, memory, etc. may be disposed on a control board attached to the HDA as required.

The main preamp 136, also referred to as a primary preamp, receives a number of input signals generated by or passed through the PC board including write data, read/write (R/W) enable and HDA selection signals. Output read data from the main preamp 136 is also processed by the PC board.

During a write operation, input write data signals are supplied to the main preamp 136 in a suitable extended frequency modulated (EFM) format such as differential PECL digital data signals, and the signals are routed through the main preamp to the appropriate preamp 132, 134. Similarly, during a read operation, differential PECL digital readback data signals are transduced and passed from the respective preamps 132, 134 to the main preamp 136. In some embodiments, the main preamp 136 has the capability of selecting and buffering data at frequencies of several Gigahertz, GHz ($10^{12}$ clocks/sec) or higher with low distortion. Thus, instead of using the main preamp 136 as a device local preamp, the preamp is repurposed as a high speed data multiplexer so that the write data are passed through the main preamp 136 and directed to a selected one of the local preamps 132, 134.

The existing head selection functions of the main preamp 136 are used to select the individual HDAs. Separate head selection and enable signals are passed from the control mux circuitry 122 (FIG. 2) to the respective local preamps 132, 134.

Figure 4:
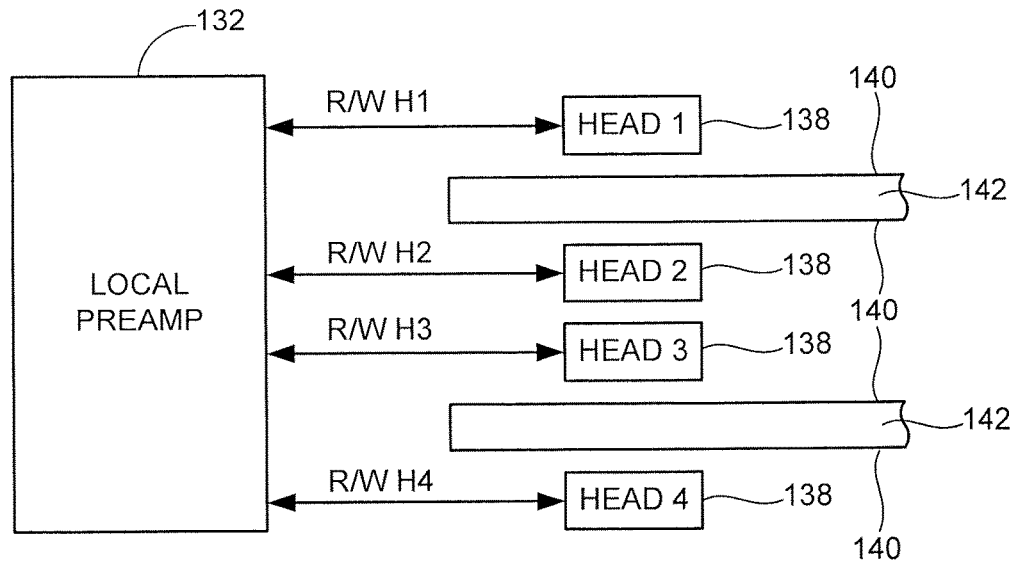
FIG. 4 shows aspects of the head disc assembly (HDA) represented in FIG. 3.

FIG. 4 illustrates operation of a selected local preamp, such as the preamp 132 from HDA1 of FIG. 3. The preamp 132 communicates over a number of parallel pathways (R/W H1 through H4) with respective data read/write transducers (heads) 138 (heads 1 through 4) adjacent data recording surfaces 140 of a pair of data recording media (discs) 142. While a two disc, four head arrangement is shown in FIG. 4, other respective numbers of discs and heads can be used in each of the HDAs.

It is contemplated that the systems 110, 130 of FIGS. 2-4 operate the respective storage devices on an individual basis so that only one storage device is powered up and operated at a time. To switch between devices, a currently powered up device is spun down and another powered down device is spun up and placed into an operationally ready state. Further details of embodiments that individually select and operate the storage devices will be presented below.

Figure 5:
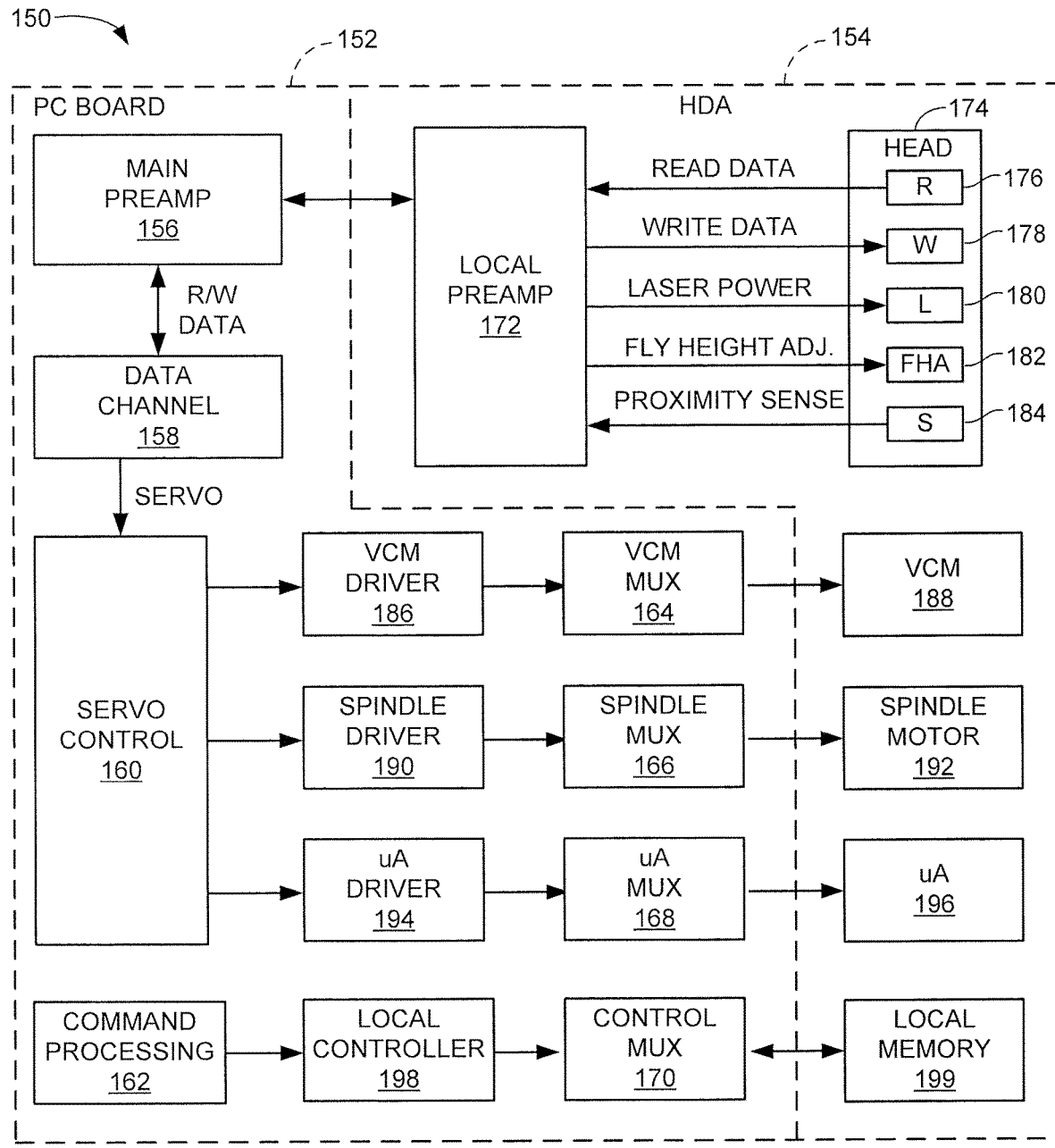
FIG. 5 is another diagram showing aspects of the system of FIG. 2 in accordance with some embodiments.

FIG. 5 provides another multi-device storage system 150 to illustrate additional features of interest in accordance with some embodiments. The system 150 is similar to the systems 110, 130 discussed above, but has the capability of operating multiple ones of the storage devices concurrently as desired. Other arrangements can be used so the general functional block relationships are merely illustrative.

The system 150 includes an external PC board 152 and an HDA 154. While only a single HDA is shown in FIG. 5, it will be appreciated that any number of additional HDAs can be incorporated as required, and that each additional HDA will have a configuration similar to that shown in FIG. 5 and will be selected in turn based on the selection logic inputs from the PC board 152.

The board 152 is shown to include a main preamp 156, a read/write (R/W) data channel 158, a servo circuit 160, a command processing block 162, and a number of mux circuits including a voice coil motor (VCM) mux 164, a spindle mux 166, a microactuator (uA) mux 168 and a control mux 170. Other configurations can readily be utilized so the representation of FIG. 5 is merely for purposes of illustration and is not limiting.

The HDA 154 includes a number of modules including a local preamp 172 in communication with a data transducer (head) 174. The head 174 is shown to incorporate one or more read elements (R) 176, one or more write elements (W) 178, a laser source (L) 180, a fly height adjustment (FHA) module 182 and a proximity sensor (S) 184. Other head configurations can readily be used so the arrangement of FIG. 5 is merely for purposes of illustration and is not limiting.

The read element(s) 176 can take a magneto-resistive (MR) construction and can be single sensors or multi-sensor configurations to support two dimensional magnetic recording (TDMR). The write element(s) 178 can be perpendicular magnetic recording elements and can be adapted for shingled magnetic recording (SMR). Where used, the laser source 180 can form a portion of a heat assisted magnetic recording (HAMR) system that applies thermal energy to a localized area during a write operation. The FHA module 180 can comprise a heater or similar module that adjusts the clearance distance (fly height) between the head 174 and the associated data recording surface (e.g., 140 in FIG. 4) through thermal expansion or other mechanisms. The sensor(s) 184 can be capacitively coupled or use other mechanisms to detect proximity and/or contact with the associated recording surface.

It is contemplated that the main preamp 156 of the PC board 152 will direct the data signals (e.g., read and write data) to the local preamp 172. Other control logic of the PC board (e.g., control mux circuitry 122 in FIG. 2) will direct additional inputs to the local preamp 172 to provide the requisite control signals (e.g., laser power, fly height, etc.) to the respective heads 174. In an alternate embodiment, the main preamp 156 can be configured to supply these additional inputs to the local preamp 172 in a pass-through fashion.

The various mux circuits 164, 166, 168, 170 represented in FIG. 5 direct different inputs to various aspects of the HDA 154. In some cases, the mux circuits continuously cycle among the various HDAs to maintain closed loop control of the various HDA functions. Accordingly, the PC board 152 will be provided with sufficient processing capacity and throughput to concurrently control all of the HDAs in the system. Only one HDA, or multiple HDAs, may be operated at a time in this embodiment.

VCM driver 186 provides drive current for VCM 188. Spindle driver 190 provides drive current for spindle motor 192. Microactuator (uA) driver 194 provides microactuation signals for uA 196. Local controller 198, as required, provides interaction with local memory 199. Other arrangements can be used depending on the extent to which these and other circuits are individually incorporated into the HDAs.

The command processing block 162 processes the input commands from the host device and supplies the requisite information to the control mux 170, which in turn communicates with a local controller 198 of the HDAA 154. The local controller 198 may utilize data and programming in a local memory 199 to carry out local control functions.

In some embodiments, the command processing block 162 maintains command queues for each of the HDAs 154 and schedules the execution of various data transfers. This enables the aforementioned data streaming to take place at high speed and fidelity; once a selected command is identified, the PC board 152 configures the associated HDA 154 and, when ready, streams the write data to or reads the data from the HDA.

The skilled artisan will recognize the serial nature of the configuration of FIG. 5. That is, generally, only a single command is executed at a time with regard to the actual transfer of data to the HDAs from the main preamp 156 or from the main preamp 156 to the respective HDAs. However, because conventional control board-storage device protocols such as command complete statuses and buffering of data are eliminated, it is contemplated that the system of FIG. 5 will provide the same level of performance as, or even better performance than, a system where the HDAs 154 receive the commands in parallel, independently execute the commands, and then wait to transfer the readback data to the control board when it is ready to receive it.

It will be noted that the system of FIG. 5 still executes commands in parallel, but at a more efficient top level rather than at the individual device level. Data will be streamed from/to one HDA while another HDA (or multiple HDAs) is/are moving the transducers or waiting for sectors to arrive to the associated heads. Multi-device queuing strategies can be implemented at the control board level so that the mux circuitry (e.g., elements 164, 166, 168, 170) are working in the background to ensure that data are substantially continuously being streamed to or from the main preamp 156 at all times at a significant data transfer rate (e.g., 2-3 GHz or more).

Similar performance efficiencies can be obtained using other forms of memory that do not necessarily have rotational latencies. For example, garbage collection, metadata retrieval and other overhead functions can be managed at the top level of the control board to coordinate the overall data transfer rate. It will be appreciated that overall system performance gains are not achieved so much by the individual performance of the storage devices but of the storage devices as a whole over time.

Figure 6:
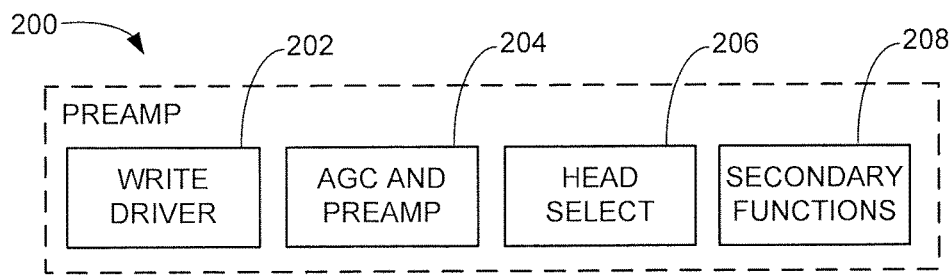
FIG. 6 shows an exemplary construction for a preamp suitable for use as the main preamp or the local preamp in FIG. 5.

FIG. 6 provides a functional block diagram of a preamp 200 in accordance with various embodiments. The preamp configuration in FIG. 6 is suitable for use in both the main preamp and the local preamps, and includes a write driver 202 for use during the transfer of write data, automatic gain control (AGC) and preamplification (preamp) circuitry 204 for use during the transfer of read data, and head selection logic 206 which can be used to select individual heads (at the storage device level) or to select individual storage devices (at the PC board level). Various secondary functions can be carried out via module 208, such as fly height adjustment, sensor management, laser power control, etc.

Those skilled in the art will recognize that current generation preamps tend to have a maximum number of output channels (e.g., heads) that can be supported by the preamps. Current trends are to reduce the total number of heads in a system, so that many current generation preamps support a maximum number of heads that is relatively small (e.g., 2, 4, 6, 8).

Figure 7:
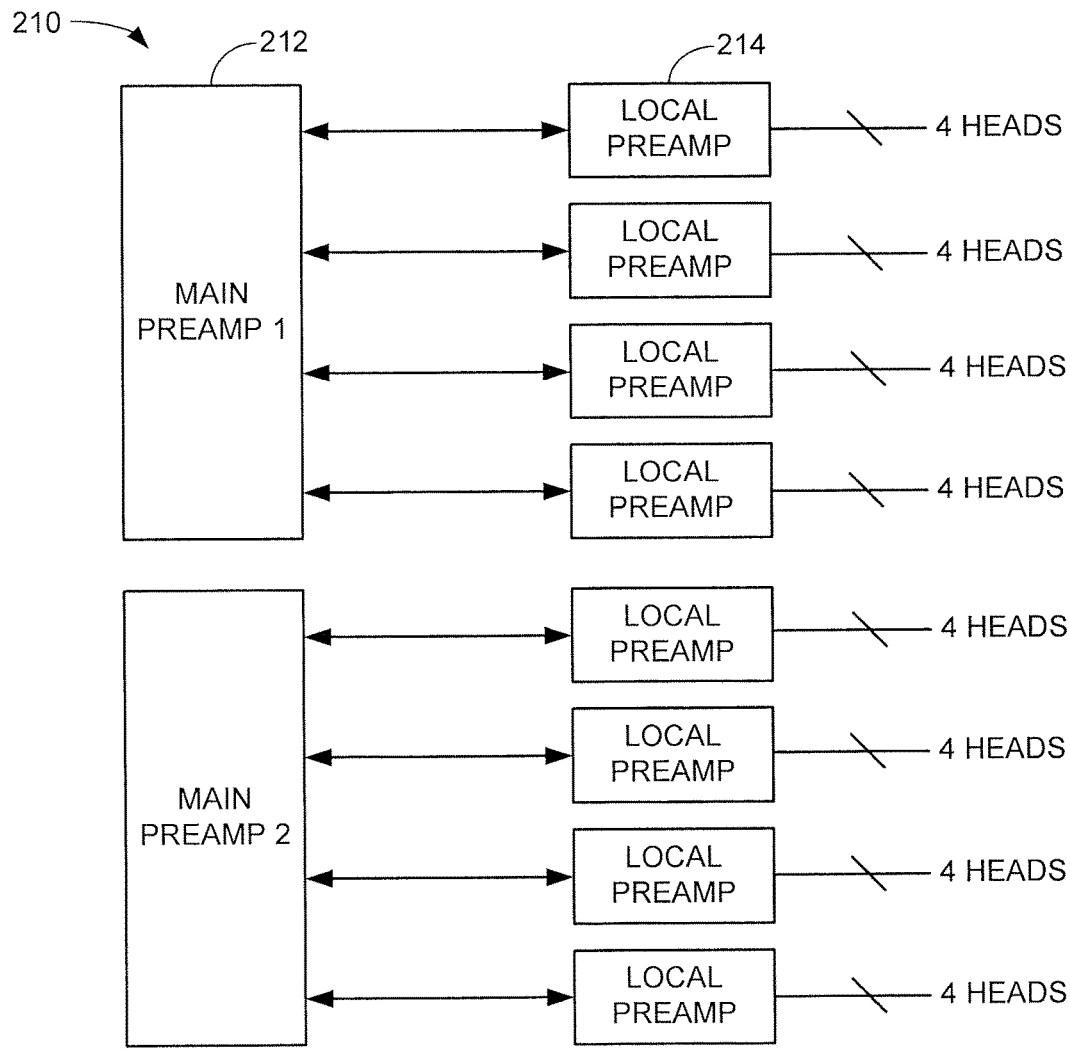
FIG. 7 illustrates another multi-device storage system in accordance with some embodiments.

Accordingly, FIG. 7 shows another multi-device storage system 210 that includes a control board configured with multiple main preamps 212. Each of the main preamps 212 provides data channel communication with a corresponding number of local preamps 214 (in this case, four). In turn, each of the local preamps 214 provides data channel communication with a corresponding number of heads (in this case, four). In this way, the configuration of FIG. 7 can support a total number of eight (8) storage devices.

Figure 8:
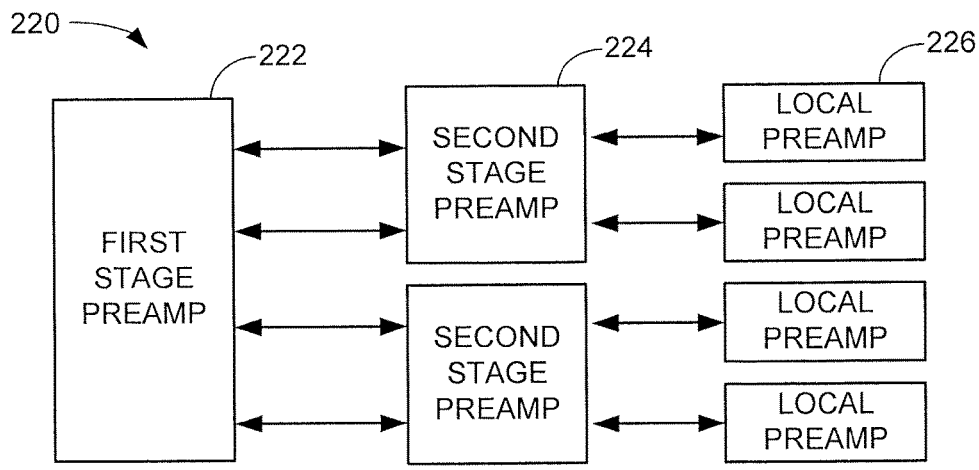
FIG. 8 illustrates another multi-device storage system in accordance with further embodiments.

FIG. 8 shows yet another multi-device storage system 220 where more than two stages of preamps are used to provide data channel communications. In FIG. 8, the system 220 includes one (or more) first stage preamps 222, multiple second stage preamps 224 (in this case, two) connected to each first stage preamp, and multiple third stage (local) preamps 226 (in this case, two) connected to each second stage preamp. Any number of stages, and connections per stage, can be used as required.

Figure 9:
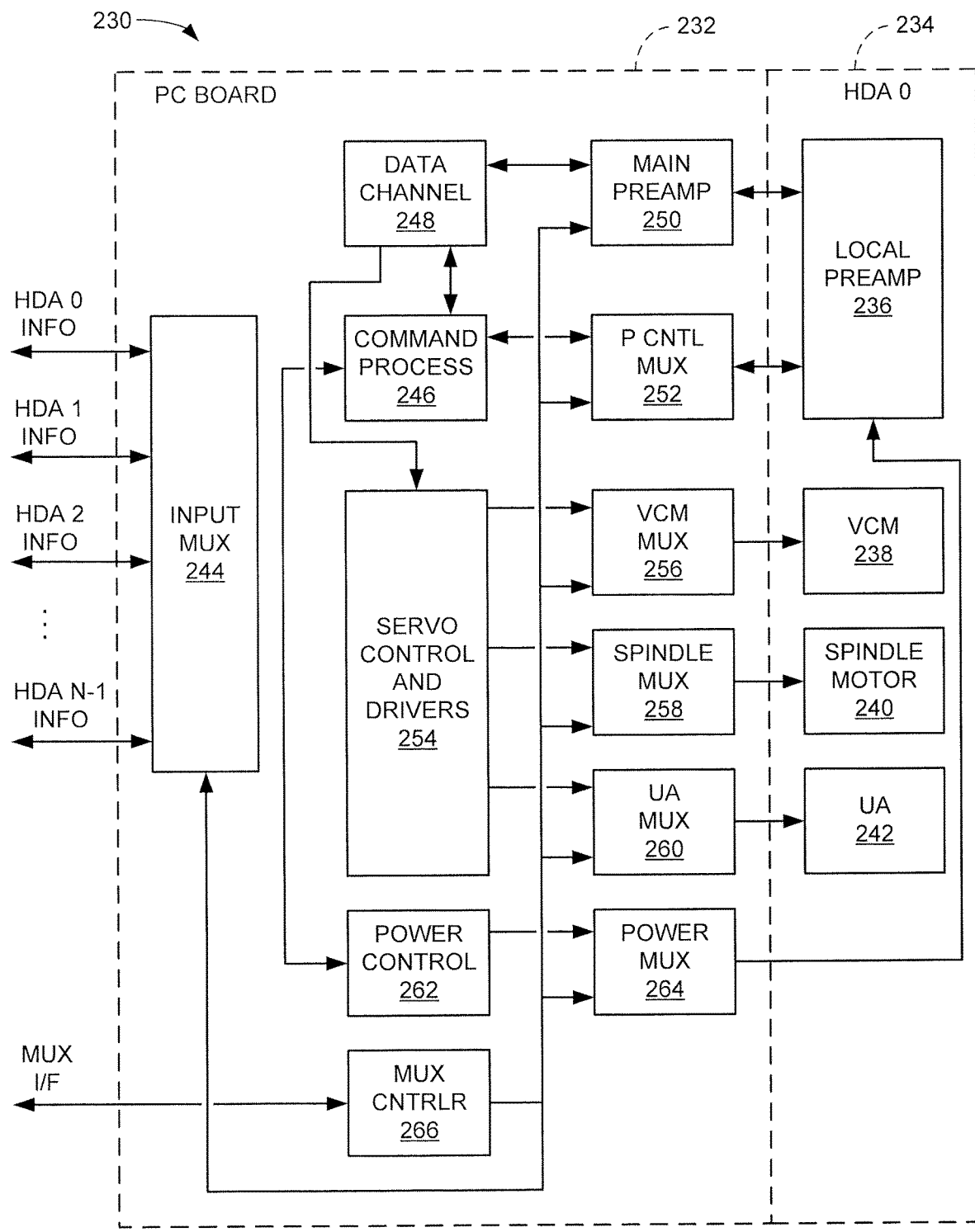
FIG. 9 is a functional block diagram for another multi-device storage system in accordance with further embodiments.

FIG. 9 provides a functional block diagram for another multi-device storage system 230 in accordance with some embodiments. The system 230 is similar to the system 150, but is configured to operate the storage devices on an individual (one at a time) basis.

The system 230 includes an external PC board 232 and a total number of N HDAs 234. The HDAs are denoted as HDA 0 through HDA N−1. Only one of the HDAs (in this case HDA 0) is shown in FIG. 9.

The HDA 234 includes a local preamp 236, a voice coil motor (VCM) 238, a spindle motor 240 and a microactuator (UA) 242. Other elements may be included in the HDA 234 as desired. It will be noted that substantially all control and driver circuitry for the HDA 234 is disposed on the PC board 232. As discussed below, the respective HDAs may be "plugged" into the PC board 232 so that the consolidated control circuitry is switched (multiplexed) from one HDA to the next as required.

The consolidated control circuitry on the PC board 232 includes an input multiplexer (mux) 244 which receives/transfers various sets of user data and commands (collectively, "HDA information") for each of the HDAs 0 to N−1. A command processing block 246 processes commands and read/write data and provides inputs to a read/write data channel 248, a main preamp 250 and a preamp control (p cntl) mux 252. The main preamp 250 facilitates data transfers with the local preamp 236 as discussed above so that write data are streamed to the associated local preamp during a write operation and readback data are received by the main preamp from the local preamp during a read operation. Control data and commands, such as head selection values, etc. are forwarded via the preamp control mux 252 to the selected local preamp.

A servo control and drivers circuit 254 receives demodulated servo data from the channel 248 and supplies various inputs to a VCM mux 256, a spindle mux 258, and a UA mux 260. Other inputs can be supplied as well, such as to fly height adjustment (FHA) modules, sensor modules, etc. but such are not shown for simplicity of illustration.

The VCM mux 256 supplies VCM control signals to the VCM 238 of the selected HDA (in this case, HDA 0). Similarly, the spindle mux 258 supplies motor control signals to the selected spindle motor 240, and the UA mux provides microactuator control signals to the selected UA 242.

A power control block 262 supplies power signals (e.g., rail voltages such as +5 VDC, −5 VDC, etc.) to a power mux 264, which in turn supplies electrical power to the various components in the selected HDA such as the local preamp 236 as shown.

Finally, a mux controller 266 receives mux interface (I/F) inputs from a host to individually select the respective HDAs. The mux controller 266 selectively configures the various mux circuits (e.g., input mux 244, preamp control mux 252, VCM mux 256, spindle mux 258, UA mux 260, power mux 264) to establish the requisite connections to the selected HDA 234. It will be appreciated that each of the foregoing mux circuits, as well as the main preamp 250, are connected to the corresponding circuitry and elements in each of the remaining HDAs.

In this way, the system 230 can be operated as a multi-device storage system with multiple HDAs 234 that are individually selected in turn. A first HDA 234, such as HDA 0 shown in FIG. 9, may be powered up from a deactivated state responsive to commands directed from the external host. Such initialization can include various steps such as accelerating the discs to operational velocity, loading of firmware/programming, movement of the transducers to a loaded position to be supported (flying) over the disc surfaces, etc. Data transfers are thereafter carried out with the activated HDA (HDA 0). All of the remaining HDAs 1 to N−1 remain in a deactivated, powered down state.

At such point that a data transfer operation is commanded with a different HDAA, such as HDAA 2, commands are given to power down (deactivate) HDAA 0. This may include the saving of various parameter and data values, the parking (unloading) of the transducers, the spinning down of the discs to rest, etc. After HDAA 0 is successfully deactivated, the newly selected HDAA 2 is subjected to initialization, after which data transfer operations are carried out with HDAA 2 as before. The foregoing process continues with each HDAA being selectively activated and deactivated in turn responsive to various host based demands.

An upstream controller (not separately shown in FIG. 9) can accumulate and process received commands for different HDAs and establish queues so that multiple pending commands are executed for each of the HDAs in turn. Alternatively, such processing can take place on the PC board 232 by the command processing block 246 or by another controller.

In some embodiments, the firmware required for each of the HDAs is stored in a single storage device (not separately shown) such as a flash memory module, and the same firmware set is used for each HDAA. In other embodiments, a total of N separate stores of the firmware, including in N separate and independent flash memory modules, are provided with the controller functions of the PC board accessing each separate set as required.

Figure 10:
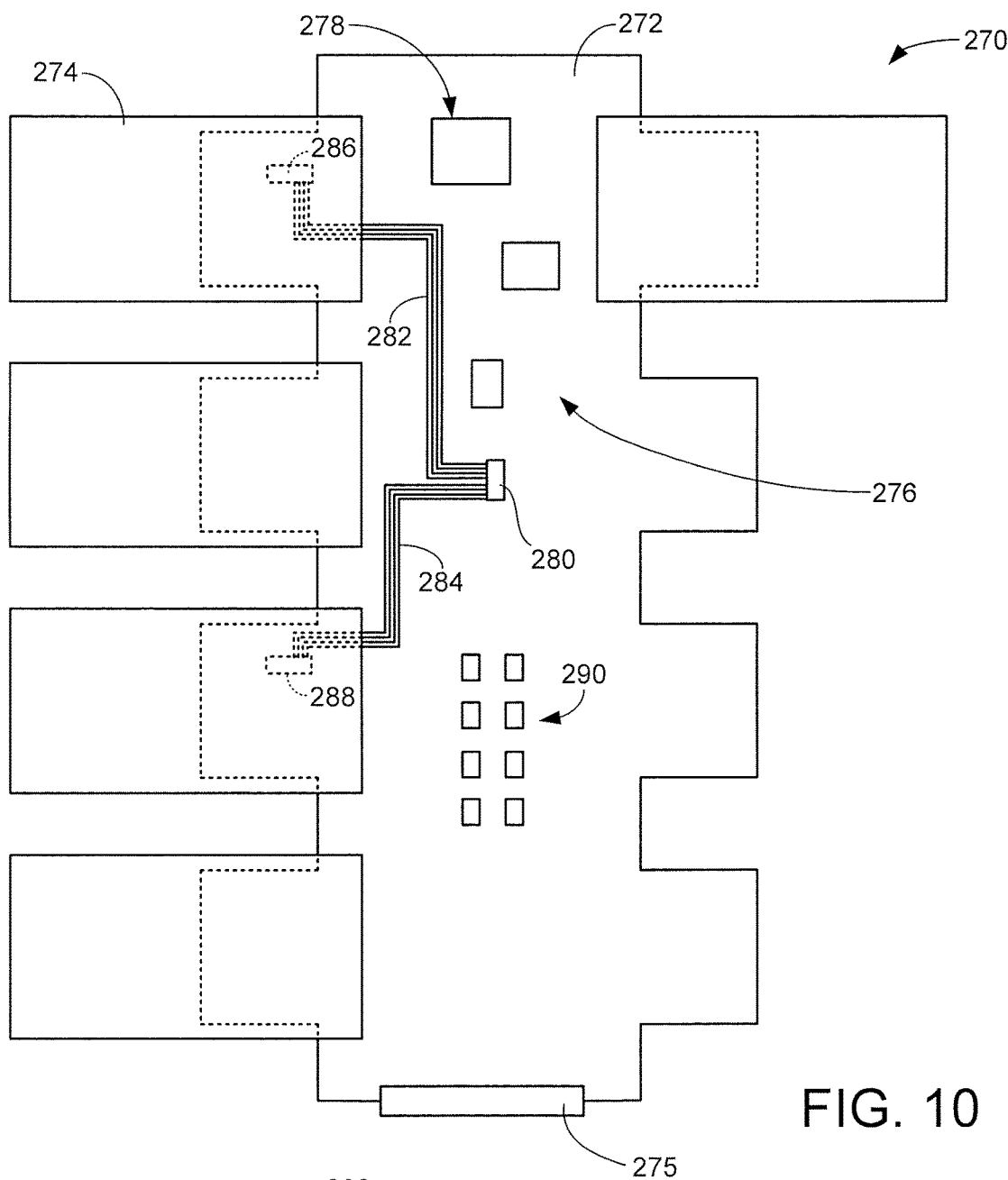
FIG. 10 is a schematic representation of a multi-device storage system similar to the system of FIG. 9.

FIG. 10 is a schematic representation of an exemplary storage system 270 similar to the system 250 in FIG. 9. A PC board 272 is configured to support a total of eight (8) HDAs 274 and selectively operate a single one of the HDAs at a time. It will be noted that only five (5) HDAs 274 are actually shown in FIG. 10. This is to better illustrate an exemplary configuration of the underlying PC board 272.

The PC board 272 takes a multilayer construction with surface mount or plated through hole (PTH) configurations to support various circuitry and establish reliable conductive paths. An electrical connector 275 facilitates interconnection of the PC board 272 in an application environment. A central area 276 of the PC board 272 supports various integrated circuit devices 278 to carry out the various functions discussed above in FIG. 9.

A main preamp is represented at 280. Electrical traces 282, 284 respectively extend to pass-through connectors 286, 288 to interconnect with the respective local preamps (e.g., 236, FIG. 9). While the overall signal trace length may be different for different ones of the HDAs 274, it has been found that these differences in trace length do not have a noticeable effect upon system performance. However, as desired special routing configurations can be provided so that the overall length of each set of signal traces (e.g., the lengths of traces 282, 284) can be nominally equal.

FIG. 10 further shows a number of flash memory ICs 290, each storing a separate set of firmware for the associated HDA 274. As each HDA 274 is activated in turn, code from the appropriate flash memory IC 290 is loaded into local RAM and used during operation of the HDA. It will be appreciated that the respective PC board 272 and HDAs 274 can take any suitable configurations as desired. In some cases, different types or styles of HDAs may be affixed to the same PC board, including HDAs with different storage capacities and performance characteristics. Moreover, other forms of storage modules, such as solid-state drive (SSD) style modules that use solid-state semiconductor memory (e.g., flash, STRAM, RRAM, etc.) can be used, either solely or in combination with different types of storage modules (e.g., two SSDs and six HDAs on the same board, etc.).

While the PC board 272 supports a total number of eight (8) storage modules (e.g., HDAs 274), other numbers of storage modules can be supported as required. Multiple sets of main preamp switching devices such as 290 can be used, including as discussed above in FIGS. 7 and 8, and multiple sets of control circuitry can be provided to interface with the respective sets of main preamps.

Figure 11:
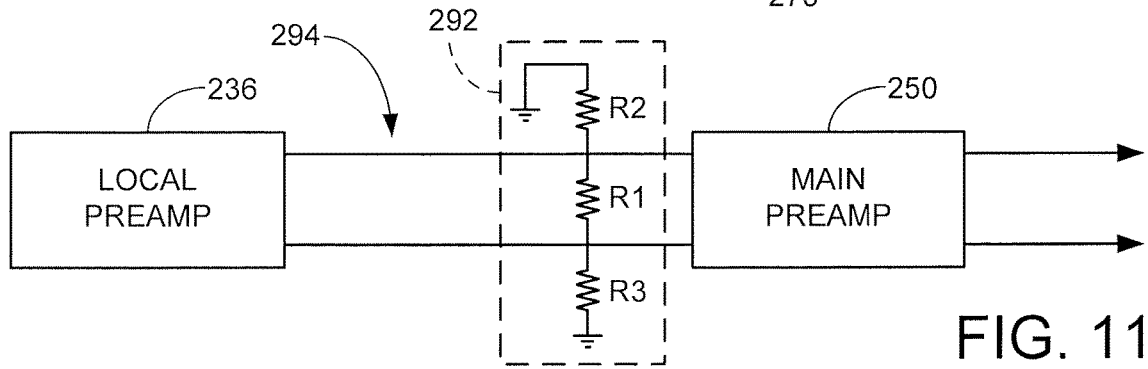
FIG. 11 shows compensation circuitry used in conjunction with the local preamp and the main preamp of various embodiments.

FIG. 11 depicts the local preamp 236 and the main preamp 250 from FIG. 9 as embodied in the storage system 270 in FIG. 10. As desired, compensation circuitry 292 can be provided adjacent the main preamp in the form of a voltage dividing resistive ladder network or other configuration to reduce the input signal strength of the output signals from the local preamp 236.

As will be appreciated, the local preamp 236 may apply signal conditioning to the readback signals obtained during a read operation, including signal amplification for the readback signals transmitted along differential pair conductors 294. The compensation circuitry 292 can be used to reduce the input voltage range of the signals to the main preamp 250 to ensure the signals are at a suitable level. The compensation circuitry 292 uses three resistors R1-R3 which operate as a voltage divider to reduce the input voltage range. Other configurations are contemplated, including active and passive filtering elements as part of the conditioning operation supplied by the circuitry 292.

Figure 12:
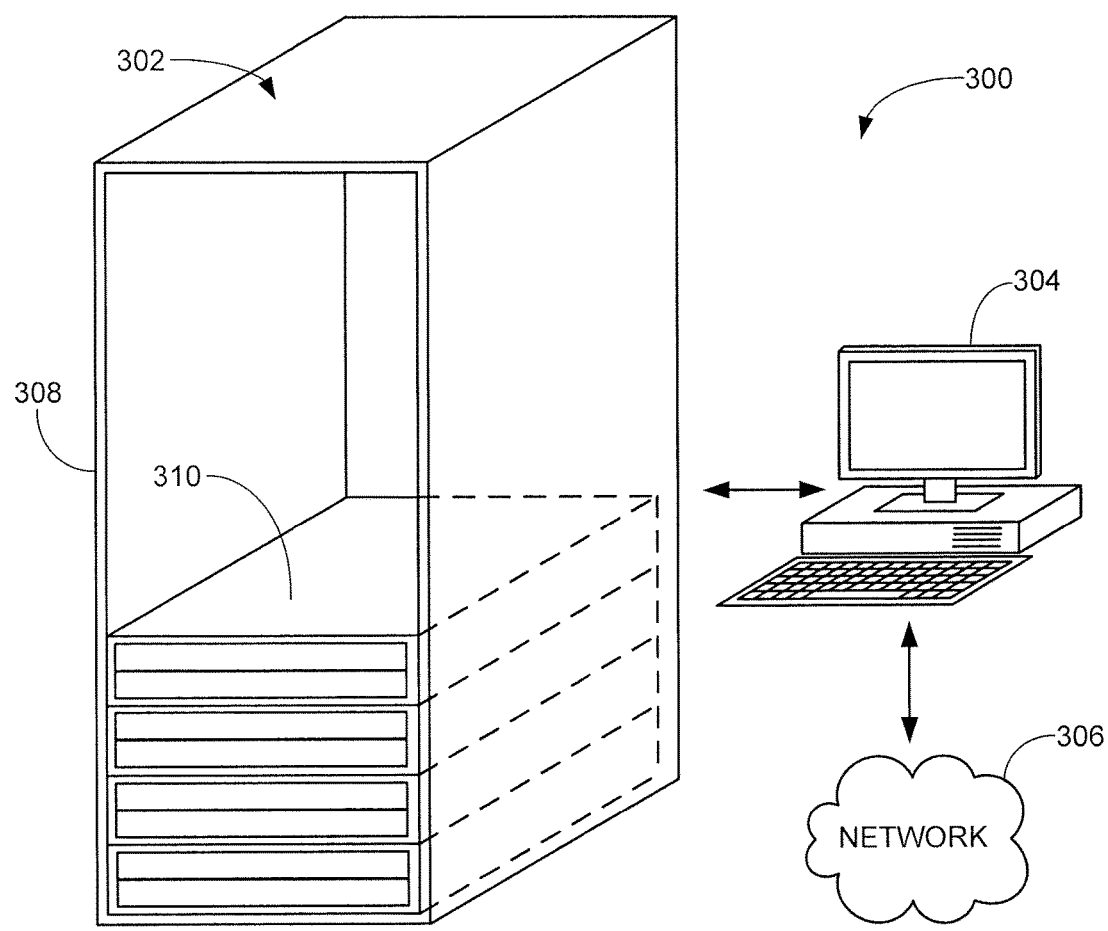
FIG. 12 is a functional representation of a networked mass storage system to illustrate a suitable operational environment for various embodiments of the present disclosure.

FIG. 12 illustrates a multi-device storage system 300 to depict an exemplary cloud computing environment. The system 300 includes a storage assembly 302 coupled to a computer 304 which in turn is connected to a network 306. The computer 304 can take a variety of forms such as a work station, a local personal computer, a server, etc. The storage assembly 302 includes a server cabinet (rack) 308 and a plurality of modular, multi-device storage enclosures 310.

In some embodiments, the storage rack 308 is a 42 U server cabinet with 42 units (U) of storage, with each unit comprising about 1.75 inches (in) of height. The width and length dimensions of the cabinet can vary but common values may be on the order of about 24 in.×36 in. Other sizes can be used. Each storage enclosure can be a multiple of the storage units, such as 2 U, 3 U, 5 U, etc.

Figure 13:
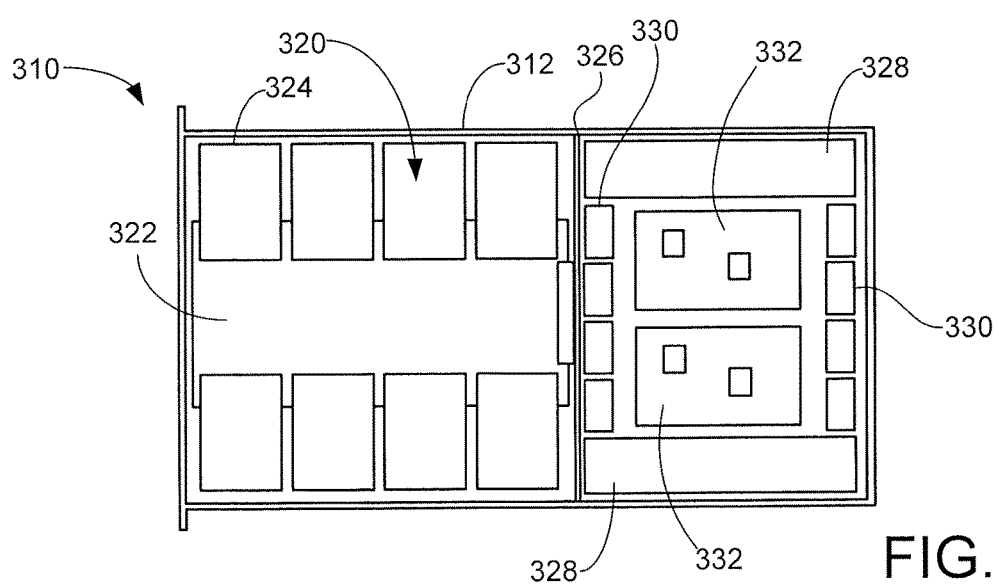
FIG. 13 is a top plan representation of a multi-device storage enclosure from FIG. 12.

An example configuration for a selected storage enclosure 310 is shown in FIG. 13. The storage enclosure 310 has a storage enclosure housing 312 adapted to be supported in the rack 308. A front portion of the interior of the housing 312 accommodates a pair of axially aligned storage systems 320. Only the topmost storage system 320 is visible in FIG. 13. The storage system 320 includes a PC board 322 and a number of storage devices (e.g., HDAs) 324 configured as discussed above. Each of the PC boards 322 has a connector 325 which mates with a midplane board 326 which spans the width of the housing 312 to facilitate electrical interconnections with the storage systems. As discussed above, the storage devices 324 can take a variety of forms, such as hard disc drives (HDDs), HDAs, solid-state drives (SSDs), hybrid drives, tape drives, optical drives, etc. to provide storage of user data.

Power is supplied to the various active elements within the storage enclosure 310 by dual redundant power supplies 328. Cooling fans 330 provide a thermally cooling airflow. The storage enclosure 310 further includes dual redundant control boards 332. The control boards 332 can serve as network switches, servers, controllers or other mechanisms to facilitate operation of the storage systems 320. In some cases, the control boards 332 are omitted and control is facilitated using controller circuitry on the respective PC boards 322. The storage devices 324 can be operated individually (e.g., one per storage system 320) to provide cold storage, or can be operated concurrently to provide higher speed performance.

Figure 14:
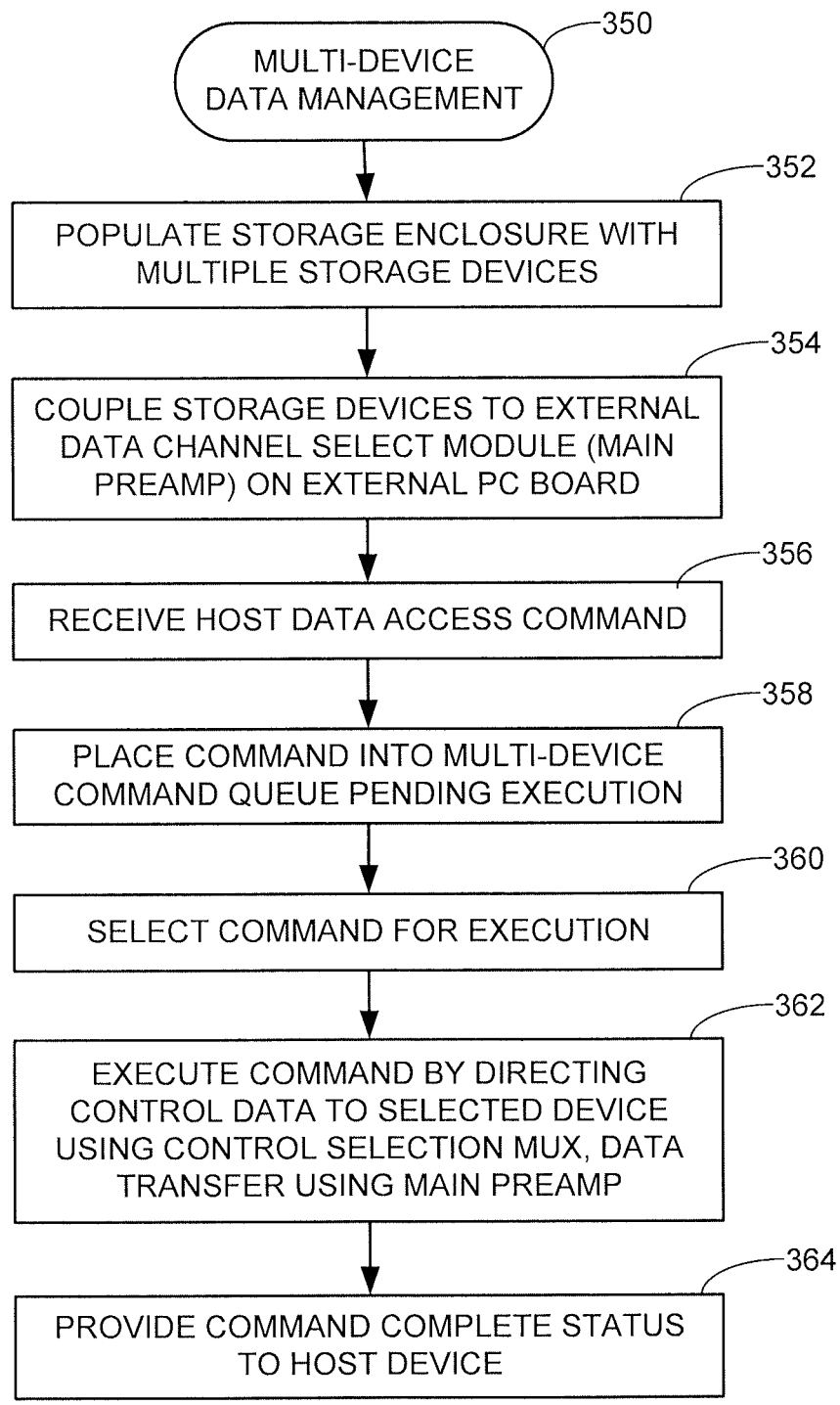
FIG. 14 is a flow chart illustrating a multi-device data management routine carried out in accordance with some embodiments.

FIG. 14 shows a flow chart for a multi-device data management routine 350 to summarize the foregoing discussion. The various steps in FIG. 14 are merely exemplary and can be modified, performed in a different order, appended, etc.

Initially, a storage enclosure such as 310 in FIGS. 12-13 is populated with multiple storage devices 324, as indicated at step 352. At step 354, the storage devices are coupled to an external data channel selection module (e.g., preamp) on an external PC board such as 322.

During operation, a host access command is received at step 356. The command is placed into a multi-device command queue that handles multiple received commands for multiple storage devices coupled to the main preamp, as shown at step 358.

A selected command is identified for execution from the queue at step 360. The command is executed by directing control data to the selected storage device associated with the command using the control selection mux circuitry, and streaming data using the main preamp, step 362. Once the command servicing is completed, a command complete status is returned to the host, step 364.

For individually selected devices, the commands are executed responsive to an initialization operation to power up the associated storage device. For concurrently selected devices, the commands may be executed concurrently in different storage devices.

While storage devices characterized as hard disc drives (HDDs) have been exemplified herein, such is merely exemplary and is not limiting. Other forms of storage devices can be used including solid-state drives (SSDs) that use semiconductor non-volatile memory to store user data. While preamplifier/driver circuits have further been exemplified in various embodiments, such is merely exemplary and is not limiting as other types of driver circuits can be implemented as desired.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
    a first data storage device comprising a first preamp to transfer data with a first local memory module of the first data storage device;
    a second data storage device comprising a second preamp to transfer data with a second local memory module of the second data storage device; and
    a third preamp positioned on a printed circuit board external to a first housing containing the first data storage device and a second housing containing the second the data storage device, the third preamp configured to stream frequency modulated write data via parallel data transfer paths to the respective first and second preamps for concurrent transfer of the frequency modulated write data to the respective local memory modules.

2. The apparatus of claim 1, wherein the local memory modules are characterized as comprising solid state memory devices or as rotatable magnetic recording surfaces and associated data transducers adapted for alignment with tracks defined on the rotatable magnetic recording surfaces.

3. The apparatus of claim 1, wherein the first and second preamps each comprise a write driver and head select logic.

4. The apparatus of claim 1, wherein the third preamp is nominally identical to each of the first and second preamps.

5. The apparatus of claim 1, wherein the third preamp is further configured to receive a stream of frequency modulated read data via the parallel data transfer paths from each of the respective first and second preamps to recover read data from the respective local memory modules.

6. The apparatus of claim 1, further comprising control data selection logic connected via parallel control data transfer paths to each of the data storage devices to selectively transfer control data to the data storage devices associated with the streamed write data.

7. The apparatus of claim 1, wherein the printed circuit board further comprises a read/write channel to process data stored in the local memory modules.

8. The apparatus of claim 7, wherein the printed circuit board further comprises servo control circuitry which generates servo control signals that are transferred via control data selection logic to each of the first and second data storage devices to control position of a data transducer in each of the local memory modules.

9. The apparatus of claim 1, further comprising a data storage device selection logic circuit which supplies a data storage device selection input signal to the third preamp to select a selected one of the data storage devices, and a head selection logic circuit which supplies a data transducing head selection input to the first and second local driver circuits to select a selected one of a plurality of data transducing heads of the selected one of the data storage devices, the third preamp, the data storage device selection logic circuit and the head selection logic circuit positioned external to each of the data storage devices.

10. The apparatus of claim 9, wherein the data storage device selection input signal is supplied to a head selection input of the third preamp.

11. The apparatus of claim 1, wherein the data storage devices are disposed in a multi-device storage enclosure, and the third preamp is disposed on the printed circuit board within a storage enclosure connected to the first and second data storage devices.

12. A multi-device storage enclosure, comprising:
    an enclosure housing;
    a printed control board disposed within the enclosure housing, the printed circuit board comprising a read/write channel and a first stage preamp circuit configured as a multi-channel data multiplexer; and
    a plurality of data storage devices each disposed within the enclosure housing and coupled to the printed circuit board, the printed circuit board positioned external to a device housing of the respective data storage devices of the plurality of data storage devices, each of the data storage devices comprising a second stage preamp circuit configured to communicate with a plurality of moveable data transducers adjacent rotatable data recording surfaces, the first stage preamp circuit comprising a head select circuit and configured to stream frequency modulated write data via parallel data transfer paths to the respective second stage preamp circuits for concurrent transfer of the frequency modulated write data to the respective data recording surfaces.

13. The storage enclosure of claim 12, wherein the first stage preamp circuit comprises a write driver circuit to output write signals during a write operation and a read preamplifier circuit to amplify input read signals during a read operation.

14. The storage enclosure of claim 12, wherein the first stage preamp circuit is further configured to receive a stream of frequency modulated read data via the parallel data transfer paths from each of the respective second stage preamp circuits to recover read data from the respective data recording surfaces.

15. The storage enclosure of claim 12, wherein the control board further comprises control circuitry which generates control data associated with the transfer of the streamed write data, and control data selection logic connected via parallel control data transfer paths to each of the data storage devices to selectively transfer the control data to the data storage devices associated with the streamed write data.

16. The storage enclosure of claim 15, further comprising a command processing module which maintains a consolidated multi-device command queue of pending commands associated with the respective data storage devices and which initiates execution of each of the pending commands in the queues to sequentially transfer data between the first stage preamp circuit and the second stage preamp circuits.

17. The apparatus of claim 12, wherein the printed circuit board further comprises a read/write channel to process the write data streamed to the second stage preamp circuits.

18. The apparatus of claim 12, wherein the printed circuit board further comprises fly height adjustment circuitry which generates and supplies a fly height adjustment input to a fly height adjustment module of a data transducer of a selected data transducing head of a selected data storage device receiving the write data.

19. A method comprising:
coupling a plurality of local preamp circuits in a corresponding plurality of data storage devices to a main driver circuit, the main preamp circuit positioned on a printed circuit board positioned external to each of the plurality of data storage devices, the main preamp circuit comprising an automatic gain control circuit; and streaming frequency modulated write data via parallel data transfer paths to the respective local preamp circuits for concurrent transfer of the frequency modulated write data to memory modules of the data storage devices coupled to the local preamp circuits.

20. The method of claim 19, wherein the memory modules of the data storage devices each comprise a plurality of moveable data transducers adjacent corresponding rotatable data recording surfaces, the preamp circuits each affixed for movement with the data transducers, and the method further comprises:
supplying a data storage device selection input signal to the main preamp circuit to identify a selected one of the data storage devices to which the write data are to be directed; and
supplying a head selection input signal to the local preamp circuit to identify a selected one of the data transducers of the selected one of the data storage devices, wherein the data storage device selection input signal and the head selection input signal are both generated by a control circuit of the printed circuit board.

* * * * *